US012734085B2

(12) United States Patent
Bosley et al.

(10) Patent No.: US 12,734,085 B2
(45) Date of Patent: *Sep. 15, 2026

(54) PATIENT TURNING APPARATUS AND METHOD

(71) Applicant: FRONTIER THERAPEUTICS LIMITED, Blackwood Gwent (GB)

(72) Inventors: Simon Bosley, Blackwood Gwent (GB); Jonathan Morse, Blackwood Gwent (GB); Lewys Webber, Blackwood Gwent (GB)

(73) Assignee: FRONTIER THERAPEUTICS LIMITED, Blackwood Gwent (GB)

( * ) Notice: Subject to any disclaimer, the term of this patent is extended or adjusted under 35 U.S.C. 154(b) by 171 days.

This patent is subject to a terminal disclaimer.

(21) Appl. No.: 18/794,626

(22) Filed: Aug. 5, 2024

(65) Prior Publication Data

US 2024/0390201 A1 Nov. 28, 2024

Related U.S. Application Data

(63) Continuation of application No. 16/759,018, filed as application No. PCT/GB2018/053126 on Oct. 29, 2018, now Pat. No. 12,076,285.

(30) Foreign Application Priority Data

Oct. 27, 2017 (GB) ..................................... 1717674

(51) Int. Cl.

*A61G 7/00* (2006.01)
*A61G 7/015* (2006.01)
*A61G 7/057* (2006.01)

(52) U.S. Cl.

CPC ............. *A61G 7/001* (2013.01); *A61G 7/015* (2013.01); *A61G 7/05776* (2013.01)

(58) Field of Classification Search

None

See application file for complete search history.

(56) References Cited

U.S. PATENT DOCUMENTS

| | | | |
|---|---|---|---|
| 3,477,071 | A | 11/1969 | Emerson |
| 5,090,071 | A | 2/1992 | Bathrick et al. |
| 5,394,577 | A | 3/1995 | James et al. |

(Continued)

FOREIGN PATENT DOCUMENTS

| | | | |
|---|---|---|---|
| DE | 3148892 | A1 | 6/1983 |
| EP | 1159947 | A2 | 12/2001 |

(Continued)

*Primary Examiner* — Adam C Ortiz

(74) *Attorney, Agent, or Firm* — Joseph C. Zucchero; Carolyn S. Elmore; Elmore Patent Law Group, P.C.

(57) ABSTRACT

A patient turning apparatus is disclosed. The apparatus comprises a reconfigurable support platform comprising a plurality of laterally extending support slats configured for pivotal movement about a longitudinally extending central region of the platform. At least one support slat is configured to follow a pivotal movement of a longitudinally adjacent support slat about the central region, through at least a portion of a pivotal range of movement of the longitudinally adjacent support slat. The apparatus further comprises means operable to control pivotal movement of at least one support slat of the platform about the central region.

16 Claims, 12 Drawing Sheets

(56) References Cited

U.S. PATENT DOCUMENTS

| | | | | |
|---|---|---|---|---|
| 2005/0160530 | A1* | 7/2005 | Taguchi | A61G 7/001<br>5/613 |
| 2007/0251009 | A1* | 11/2007 | Kim | A61G 7/001<br>5/607 |
| 2009/0077748 | A1* | 3/2009 | Kim | A61G 7/053<br>5/613 |
| 2012/0266382 | A1 | 10/2012 | Goddert | |
| 2016/0000629 | A1* | 1/2016 | Jackson | A61G 13/02<br>5/601 |
| 2017/0049242 | A1* | 2/2017 | Franken | A47C 31/123 |

FOREIGN PATENT DOCUMENTS

| | | | |
|---|---|---|---|
| GB | 2449318 | C | 7/2015 |
| JP | H04297257 | A | 10/1992 |

* cited by examiner

PATIENT TURNING APPARATUS AND METHOD

RELATED APPLICATIONS

This application is a continuation of U.S. application Ser. No. 16/759,018, filed Apr. 24, 2020, which is a US National stage entry of International Application No. PCT/GB2018/053126, which designated the United States and was filed on Oct. 29, 2018, published in English and which claims priority to GB Application No. 1717674.4, filed Oct. 27, 2017. The entire teachings of the above applications are incorporated herein by reference.

The present invention relates to patient turning apparatus and method.

Individuals who are unable to move autonomously and thus restricted to a particular position, such as a recumbent position when lying on a bed, are prone to developing pressure sores. To minimise the development of these sores, it is necessary to reposition the individual upon the bed at regular intervals. However, this is often difficult for a single carer and often requires several carers to suitably reposition the individual. Moreover, given that those individuals who are susceptible to developing pressure sores require repositioning at regular intervals, typically every 2 hours, then it is evident that this is a time intensive process.

GB2449318 discloses an automatic patient turning apparatus having a support platform comprising support sections, which can pivot about a central longitudinal region of the platform to turn a patient lying thereon onto their left or right side. The disclosed apparatus comprises two support sections disposed at each side of the central region which are uncoupled, so that the sections can pivot independently of each other. The uncoupled nature of the two sections at each side of the central region enables the platform to pivot as the configuration of the underlying bed changes. However, the skilled reader will recognise that the positioning of the separation between sections must match the location of the hinge coupling between sections of the underlying bed frame to enable the pivotal movement of the platform. In this respect, a two section support platform is required for a bed frame having two sections which are hingedly coupled. Similarly, a three-section support platform would be required for a bed frame having three sections. It is evident therefore that the apparatus is restricted to the particular bed frame. Moreover, it is desirable for sections of a bed frame to move through auto-regression, whereby the location of the hinge coupling between sections of the bed frame move along the bed to follow the natural movement of a patients legs and waist flexion, for example.

We have now devised an improved patient turning apparatus and method.

In accordance with a first aspect of the present invention there is provided a patient turning apparatus comprising a reconfigurable support platform comprising a plurality of laterally extending support slats configured for pivotal movement about a longitudinally extending central region of the platform, at least one support slat being configured to follow a pivotal movement of a longitudinally adjacent support slat about the central region, through at least a portion of a pivotal range of movement of the longitudinally adjacent support slat, the apparatus further comprising means operable to control pivotal movement of at least one support slat of the platform about the central region.

In an embodiment, each support slat is configured to follow a pivotal movement of a longitudinally adjacent support slat about the central portion, through at least a portion of a pivotal range of movement of the longitudinally adjacent support slat. The support slats are interconnected to permit the support slats to pivot in response to a pivoting of a longitudinally adjacent support slat beyond a threshold pivotal range.

In an embodiment, the support slats extend in a substantially parallel configuration when configured in an un-pivoted configuration, and are longitudinally separated along the platform.

In an embodiment, the plurality of laterally extending support slats comprise a first plurality of laterally extending support slats which extend to a first side of the central region and a second plurality of laterally extending support slats which extend to a second side of the central region. The first and second plurality of support slats extend in substantially the same plane when configured in an un-pivoted configuration. The first and second plurality of support slats extend at a right and left side of the central region of the platform.

In an embodiment, the support platform further comprises a support sheet, which may be formed of a plastics or fabric material, for example. The support sheet comprises a plurality of laterally extending pockets formed therein for separately receiving a support slat. The pockets extend from a longitudinally extending central portion of the support sheet and comprise a respective opening formed proximate a lateral edge of the support sheet. In an embodiment, the support sheet comprises a first plurality of laterally extending pockets which extend to a first side of the central portion of the support sheet and a second plurality of laterally extending pockets which extend to a second side of the central portion of support sheet. The openings may be closable via a respective flap, which may be releasably secured to the sheet via fastening means, such as a hook-and-loop (Velcro®) fastening arrangement. Alternatively, the openings may be closed via a weld for example, once the supports slats have been inserted within the respective pockets.

In an embodiment, the apparatus further comprises a reconfigurable base which is disposed in use at an underside of the platform. The base is reconfigurable at least along a longitudinal direction thereof, and is arranged to conform to a support surface of a bed frame and is reconfigurable to conform with a reconfiguration of the bed support surface.

In an embodiment, the base comprises a plurality of laterally extending base slats which extend across a width of the base, to either side of a central region of the base. The base comprises a base sheet which may be similarly formed of a plastics or fabric material. The base sheet comprises a plurality of laterally extending pockets formed therein for separately receiving a base slat. The pockets extend along a width of the base sheet, to either side of a central portion of the base sheet, and comprise an opening formed at one end thereof, through which a slat can be inserted into the pocket. The openings may be closable via a respective flap, which may be releasably secured to the base sheet via fastening means, such as a hook-and-loop (Velcro®) fastening arrangement. Alternatively, the openings may be closed via a weld for example, once the base slats have been inserted within the respective pockets.

The base slats provide a lateral rigidity to the base, however the longitudinal spacing of the base slats within the flexible base sheet permits the base to reconfigure along a longitudinal direction and thus conform with undulations and/or profiling of the underlying bed frame. The spacing further enables auto-regression of the underlying bed frame to take place.

In an embodiment, the central portion of the support sheet and a central region of the base are coupled together via rivets which extend through the support sheet and the base sheet, and at least one of the slats which extend across the width of the base sheet.

In an alternative embodiment, the plurality of base slats may be configured for pivotal movement about a longitudinally extending central region of the base. In this respect, the plurality of base slats may comprise a first plurality of laterally extending base slats which extend to a first side of the central region and a second plurality of laterally extending base slats which extend to a second side of the central region. In this embodiment, the base comprises a base sheet, which may similarly be formed of a plastics or fabric material having a plurality of laterally extending pockets formed therein for separately receiving a base slat. The pockets extend from a longitudinally extending central portion of the base sheet and comprise a respective opening formed proximate a lateral edge of the base sheet. The openings may be closable via a respective flap, which may be releasably secured to the base sheet via fastening means, such as a hook-and-loop (Velcro®) fastening arrangement. Alternatively, the openings may be closed via a weld for example, once the base slats have been inserted within the respective pockets. In this embodiment, the base sheet comprises a first plurality of laterally extending pockets which extend to a first side of the central portion of the base sheet and a second plurality of laterally extending pockets which extend to a second side of the central portion of base sheet.

In an embodiment, the central portion of the support sheet and the central portion of the base sheet are coupled together via rivets or a weld or other fastening means.

In an embodiment, the means operable to control pivotal movement of at least one support slat of the platform is disposed, in use, at an underside of the platform. The means operable to control pivotal movement of at least one support slat of the platform may comprise an inflatable bladder, and in an embodiment is disposed between the platform and the base to permit the support slats to pivot with respect to the base.

In an embodiment, the inflatable bladder extends longitudinally of the apparatus and comprises a plurality of bladder portions fluidly coupled via a conduit.

In an embodiment, the apparatus further comprises a pump which is fluidly coupled to the inflatable bladder via a duct, such as a hose. The apparatus further comprises a control unit for controlling operation of the pump to control a selected inflation and deflation of the inflatable bladder. The control unit further comprises a timer or clock for inflating and deflating the inflatable bladder at pre-selected times.

In an embodiment, the means operable to control pivotal movement of at least one support slat of the platform comprises a first inflatable bladder and a second inflatable bladder, respectively disposed in use at an underside of the first and second plurality of support slats. The control unit and pump are arranged to selectively inflate and deflate the first and second inflatable bladder.

In an embodiment, the support slats, base slats, support sheet and base sheet are enclosed within a removable cover, which can be sealed to minimise any ingress of dirt or infectious material onto the support and base sheet.

In an alternative embodiment, the support platform comprises a plurality of interconnected support elements, each element being detachably coupled at a proximal end thereof, to a longitudinally extending central region of a reconfigurable base, disposed in use at an underside of the platform.

The support elements may be orientated to extend laterally across the support platform, and comprise a first plurality of support elements which extend to a first side of a longitudinally extending central portion of the platform and a second plurality of support elements which extend to a second side of the central portion of the platform.

In an embodiment, the pockets extend from a central portion of the platform, to either side of the central portion and comprise an opening formed at a distal end thereof, through which a support slat can be inserted into the pocket.

The supports elements may comprise a substantially triangular shape, whereby sides of each element converge from the distal end to the proximal end thereof. In this respect, it is envisaged that the support slats which are configured to be inserted within the pocket comprise a similar shape to accommodate the contour of the pocket.

In an embodiment, the means operable to control pivotal movement of at least one support slat of the platform comprises an inflatable bladder, which may comprise at least two inflatable chambers.

In an embodiment, each support element comprises a respective inflatable bladder for effecting a pivotal movement of the respective support slat.

In an embodiment, the reconfigurable base comprises a base sheet. The base sheet comprises a plurality of laterally extending pockets formed therein for separately receiving a base slat. The pockets extend from a longitudinally extending central region of the base sheet and comprise a respective opening formed proximate a lateral edge of the base sheet.

In an embodiment, the base sheet comprises a first plurality of laterally extending pockets which extend to a first side of the central region of the base sheet and a second plurality of laterally extending pockets which extend to a second side of the central region of base sheet.

In an embodiment, the support elements are interconnected to permit the support slats to pivot in response to a pivoting of a longitudinally adjacent support slat beyond a threshold pivotal range.

In an embodiment, the inflatable chambers associated with each support element are fluidly coupled to each other via a conduit.

In an embodiment, the apparatus further comprises a control unit and a pump, the control unit being arranged to control operation of the pump to control a selected inflation and deflation of the inflatable bladder. The apparatus may further comprise a timer or clock for selected timing of the inflation and deflation of the inflatable chamber.

According to a second aspect of the invention there is provided a patient turning apparatus comprising a patient turning apparatus comprising: a reconfigurable support platform comprising: a first plurality of laterally extending support slats which extend to a first side of a central region of the platform and a second plurality of laterally extending support slats which extend to a second side of the central region of the platform, both the first plurality and second plurality of laterally extending support slats configured for pivotal movement about the longitudinally extending central region of the platform; at least one support slat being configured to follow a pivotal movement of a longitudinally adjacent support slat about the central region, through at least a portion of a pivotal range of movement of the longitudinally adjacent support slat; a pivot controlling means operable to control pivotal movement of at least one support slat of the platform about the central region; and a reconfigurable base detachably coupled to and disposed in use at an underside of the reconfigurable support platform.

According to a third aspect of the invention there is provide a method for turning a patient using a patient turning apparatus according to any previous claim, the method comprising the steps: pivoting a first plurality of laterally extending support slats through a first pivotal range; subsequently pivoting a second plurality of laterally extending support slats through a second pivotal range, the second pivotal range being less than that of the first pivotal range; and subsequently pivoting the first plurality of laterally extending support slats beyond the first pivotal range, while the second plurality of support slats remain pivoted through the second pivotal range.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 5:
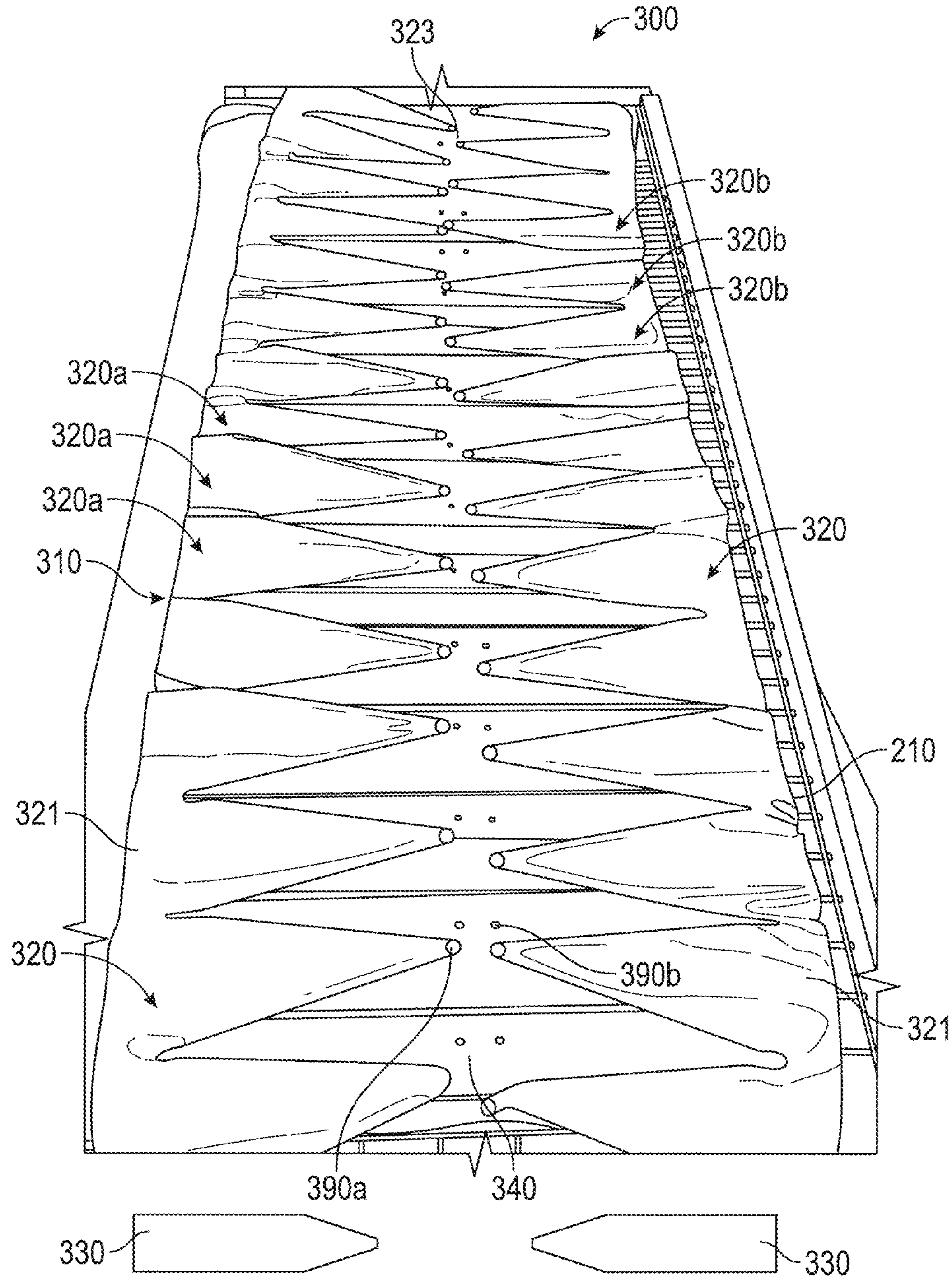
FIGS. 5 and 6 are perspective views of patient turning apparatus according to a second embodiment of the present invention, disposed upon a bed frame configured in a flattened configuration, with the reconfigurable support platform being detached (FIG. 5) and coupled (FIG. 6) to the reconfigurable base, respectively.
Figure 10:
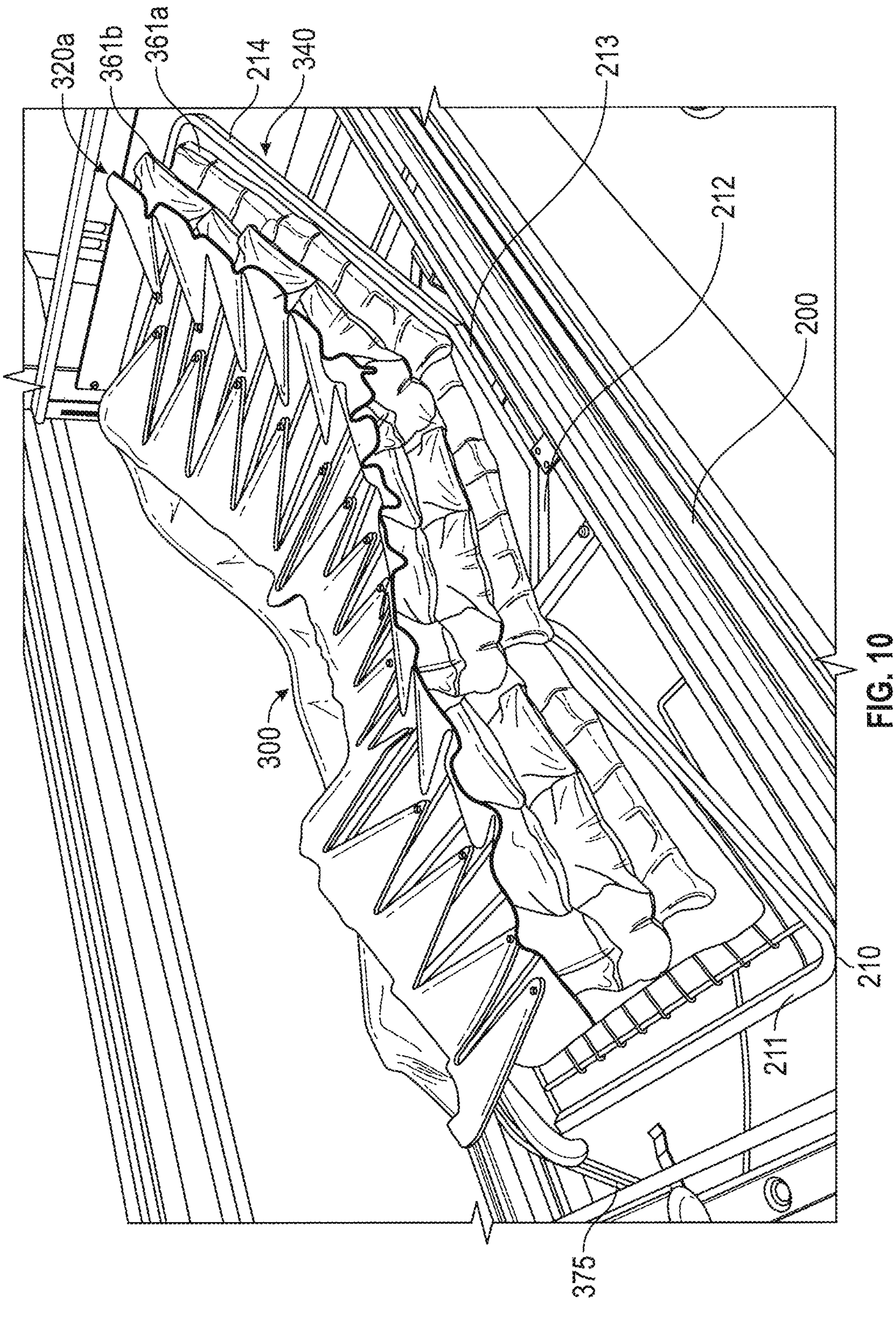
Figure 11:
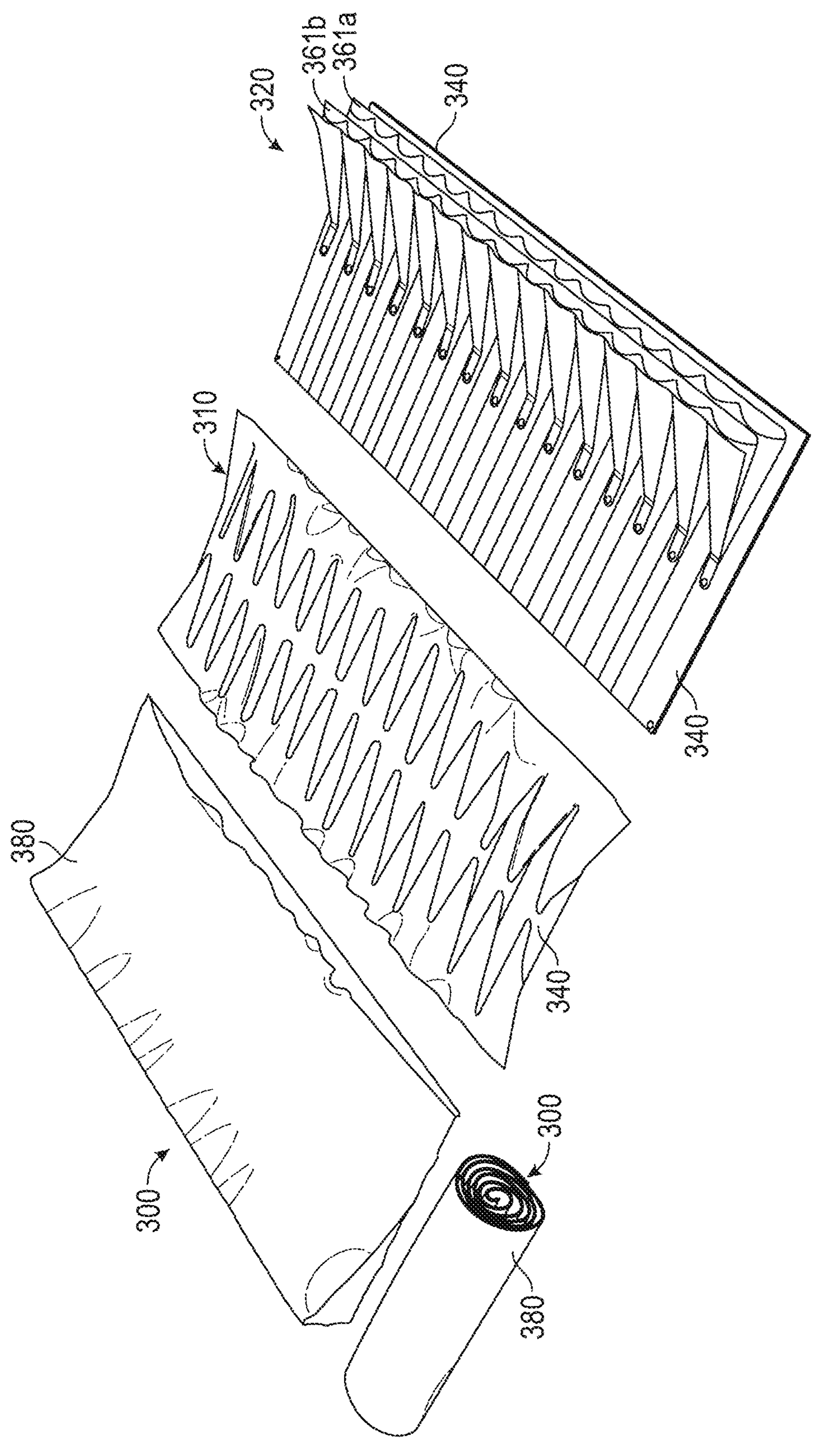
Figure 12:
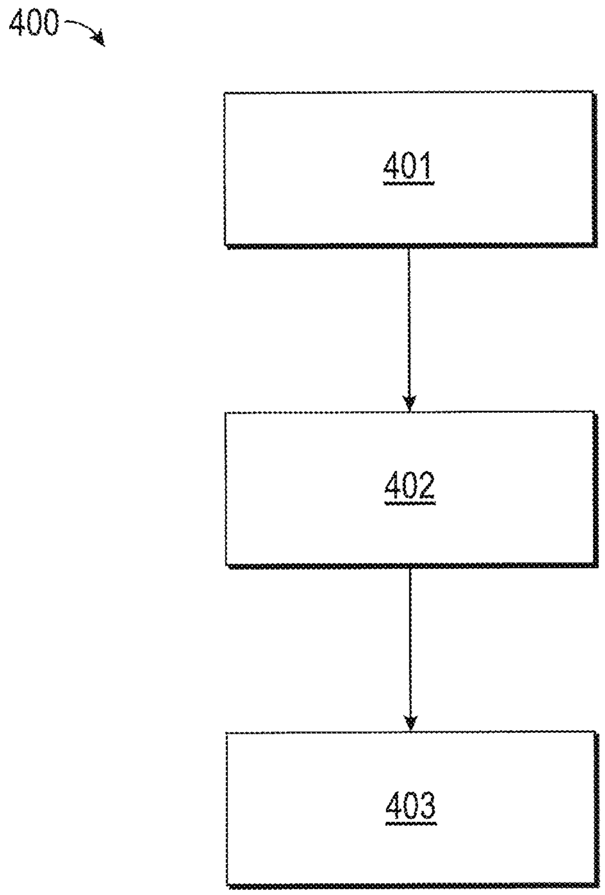

FIG. 10 is a perspective view of the patient turning apparatus illustrated in FIG. 5, disposed upon a bed frame configured in a profiled configuration, with the second plurality of support slats pivoted about the central portion; and, FIG. 11 is an isometric view of the patient turning apparatus illustrated in FIG. 5, arranged in multiple configurations. FIG. 11*a* illustrates the apparatus in a stowed (rolled) configuration; FIG. 11*b* illustrates the apparatus in an unstowed configuration with the cover removed; FIG. 11*c* illustrates the apparatus with the second plurality of support elements pivoted; and FIG. 11*d* illustrates the apparatus in an unstowed configuration, with the second plurality of support elements removed, and the first plurality of support elements pivoted; and, FIG. 12 is a flow chart outlining the steps associated with a method of turning a patient according to an embodiment of the present invention.

Figure 1:
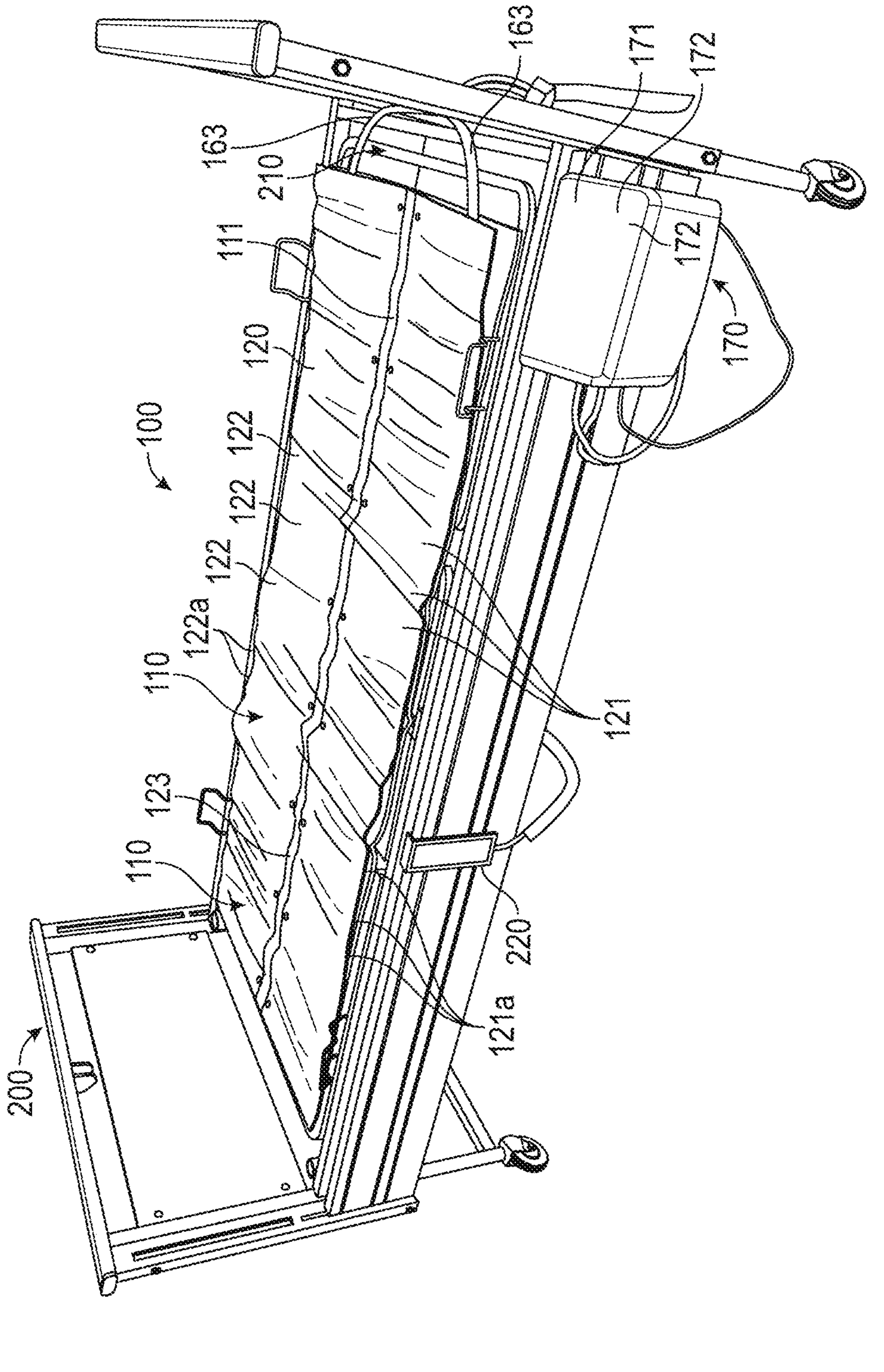
FIG. 1 is a perspective view of a patient turning apparatus according to a first embodiment of the present invention, disposed upon a bed frame configured in a flattened configuration.
Figure 2:
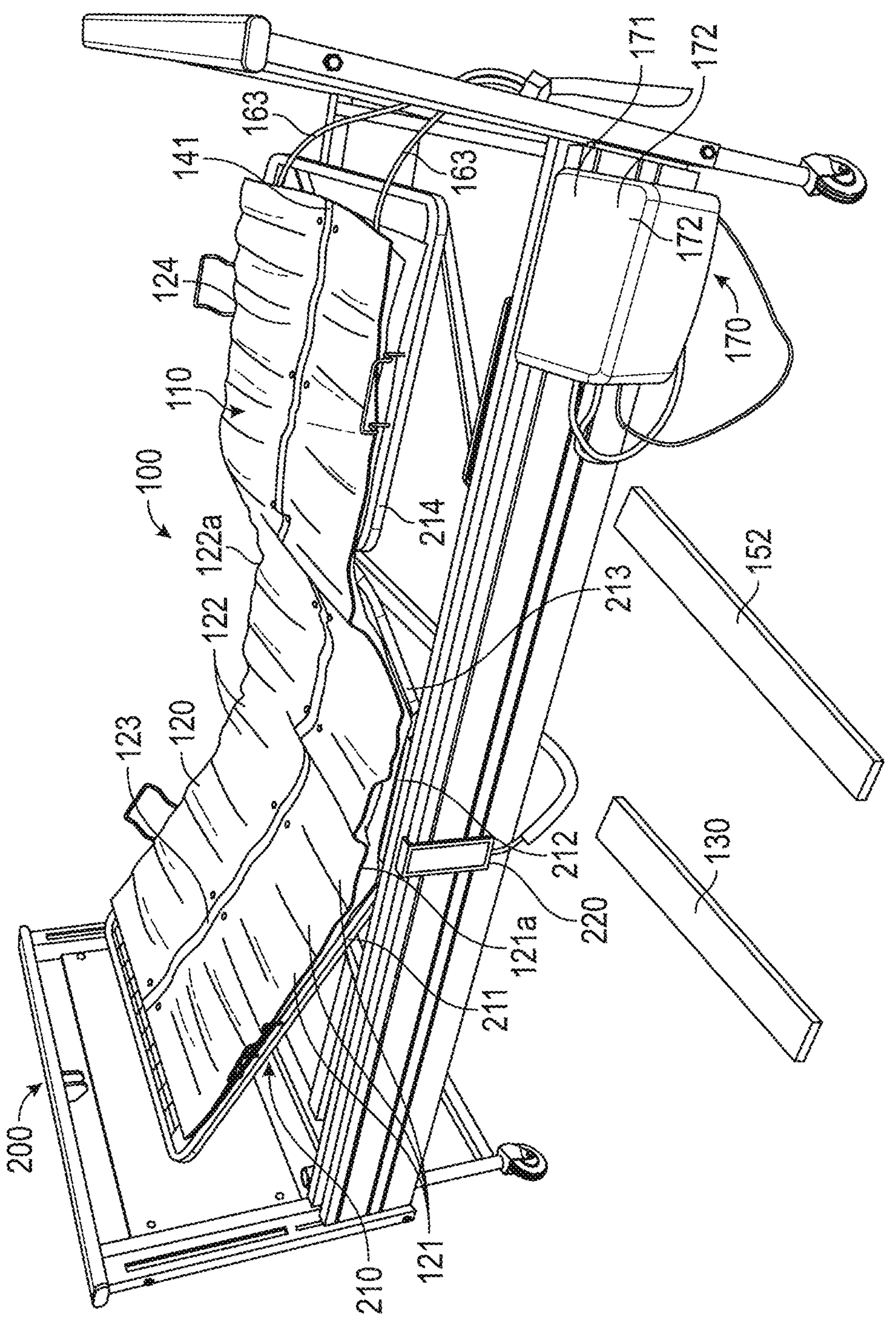
FIG. 2 is a perspective view of the patient turning apparatus illustrated in FIG. 1, disposed upon a bed frame configured in a profiled configuration.

Referring to FIGS. 1 and 2 of the drawings, there is illustrated a patient turning apparatus 100 according to an embodiment of the present invention, disposed upon a bed frame 200 arranged in a flattened configuration or profile. The bed frame 200 comprises a support frame 210 upon which the apparatus 100 is disposed and in the illustrated embodiment, the support frame 210 comprises four frame sections 211-214 which are hingedly coupled along a lateral direction and which are arranged to provide support to different regions of a patient (not shown), such as the patient's upper body, waist region and lower body. The frame sections 211-214 are arranged to pivot with respect to each other about the respective coupling (not shown) to reconfigure a longitudinal profile of the support frame 210. The frame sections 211-214 are moved relative to each other about the respective hinge couplings (not shown) using a driving mechanism (not shown) which may be controlled via a controller 220. The driving mechanism may be hydraulic, pneumatic or electric mechanism for example, and is arranged to suitably configure the support frame 210 to a preferred profile, such as that illustrated in FIG. 2 of the drawings, to suit the patient.

The apparatus 100 comprises a reconfigurable support platform 110 which in use is arranged uppermost on the support frame 210 of the bed frame 200, and arranged to extend adjacent a mattress (not shown), for example. The support platform 110 comprises a flexible support sheet 120 which may be formed of a plastics material, such as polyurethane, or a fabric material, such as Nylon®, for example. The support sheet 120 comprises a plurality of elongate pockets 121, 122 formed therein which are orientated to extend laterally across the sheet, in a substantially parallel configuration. The pockets 121, 122 are configured to a first plurality of pockets 121 which extend to a first side of a central longitudinal portion 123 of the sheet 120 and a second plurality of pockets 122 which extend to a second side of the central longitudinal portion 123.

The pockets 121, 122 comprise an opening 121*a*, 122*a* disposed at a distal end thereof, which respectively comprise a first and second lateral edge of the sheet 120 and are closed at a proximal end thereof, which is disposed adjacent the central longitudinal portion 123 of the support sheet 120. The opening may be closable via a respective flap (not shown) which is secured at an underside of the support sheet, and arranged to pivot around the distal end of the pocket to an upperside of the support sheet to close the opening 121*a*, 122*a*. The flap may be detachably coupled to the sheet via fastening means (not shown), such as a hook-and-loop type fastening arrangement (not shown). Alternatively, the openings may be closed via a weld for example, once the slats have been inserted within the respective pockets. The pockets 121, 122 are arranged to separately receive a support slat 130 having a substantially planar, elongate shape. The support slats 130 are formed of a rigid, plastics material, such as high density polyethylene, and are arranged to provide a structural frame to the support sheet 120. The support slats 130 are longitudinally separated along the platform 110; however, owing to the slats 130 being disposed within the pockets 121, 122 and the interconnection between pockets 121, 122 by the support sheet 120, it is evident that any pivotal movement of one slat 130 will cause longitudinally adjacent slats 130 in adjacent pockets to follow the pivotal movement. For example, as one slat 130 is pivoted upwardly about the central portion 123, the portion 124 of the sheet 120 disposed between the pocket holding the one slat and adjacent pockets will cause the slats in the adjacent pockets to also pivot.

The apparatus 100 further comprise a base 140 which in use is arranged lowermost on the support frame 210 of the bed frame 200 and arranged to extend adjacent the support frame 210. The base 140 similarly comprises a flexible base sheet 150, which may be formed of a plastics material, such as polyurethane, or a fabric material, such as Nylon®, for example. The base sheet 150 comprises a plurality of elongate pockets 151 formed therein which are orientated to extend laterally across the sheet, in a substantially parallel configuration. The pockets 151 are separately arranged to receive a base slat 152 having a substantially planar, elongate shape. The base slats 152 are similarly formed of a rigid, plastics material, such as high density polyethylene, and are arranged to provide a structural frame to the base sheet 150.

In an embodiment, the pockets 151 extend across the full width of the base sheet 150, either side of a central region 141 of the base 140. The pockets 151 comprise a respective opening 153 disposed along a longitudinal edge of the base sheet 150 for receiving a respective slat 152, which similarly extends across the full width of the base sheet 150, either side of the central region 141. The openings 153 maybe closable by a respective flap (not shown), similar to the flaps (not shown) associated with the support sheet 120, or closed via a weld once the slats have been inserted within the respective pocket. The rigid nature of the base slats 152 provides a lateral stiffness and lateral rigidity to the base 140 which resists any flexing of the base 140 along the width thereof. However, the disposition of the base slats 152 within the separated pockets 151 of the flexible base sheet 150 permits the base 140 to reconfigure along the length thereof to accommodate any variation or profile of the underlying support frame 210.

In an alternative embodiment which is not illustrated, the pockets 151 of the base 140 are configured to a first plurality of pockets 151 which extend to a first side of a central longitudinal portion (not shown) of the base sheet 150 and a second plurality of pockets 151 which extend to a second side of the central longitudinal portion. The pockets 151 comprise an opening disposed at a distal end thereof, which respectively comprise a first and second longitudinal edge of the base sheet 150 and are closed at a proximal end thereof, which is disposed adjacent the central longitudinal portion of the base sheet 150. In this respect, the first plurality of pockets 151 are arranged to receive a first plurality of base slats 152 and the second plurality of pockets are arranged to receive a second plurality of base slats 152. The first and second plurality of base slats 152 are separately configured to provide a lateral rigidity to the base 140 at the first and second side of the central region 141 of the base 140, while enabling the base 140 to articulate about the central region 141 to match any lateral undulation of the support frame 210. It is envisaged that this separation of the base slats 152 into a first and second group will provide for an additional flexibility to the apparatus 100 to accommodate a further variety of bed support frames.

In either embodiment of the base 140, the longitudinal separation of the base slats 152 enables the base 140 to conform to a longitudinally undulating bed support frame 210 and moreover, adopt the profile of the bed support frame 210. In this respect, it is evident that the base 140 can follow the profile or contour of a multi-section bed frame and is not restricted for use with a three or four section profiling bed frame 200, for example.

The apparatus 100 further comprises means 160 operable to control pivotal movement of at least one support slat 130 of the platform about the central portion. In the embodiment illustrated in FIGS. 3 and 4 of the drawings, the means 160 comprises a first inflatable bladder 161 and a second inflatable bladder (only one of which is illustrated in the drawings) which is disposed at the underside of the support platform 110, between the support platform 110 and the base 140. In particular, the first bladder 161 is arranged to extend longitudinally of the apparatus 100, between the first plurality of support slats 130 and of the underlying base slats 152. Similarly, the second bladder is arranged to extend longitudinally of the apparatus 100, between the second plurality of support slats 130 and the underlying base slats 152.

The first inflatable bladder 161 and second inflatable bladder (not shown) may separately comprise a plurality of chambers 161*a-c* fluidly coupled via a respective conduit 162. The embodiment illustrated in FIG. 4 of the drawings comprises only three sub-chambers 161*a-c*, however it is to be appreciate that fewer or more sub-chambers may be used. The chambers 161*a-c* and conduit 162 may comprise a single integral bladder 161 with the conduits 162 comprising narrowed or neck regions of the respective bladder 161. Alternatively, the conduits 162 may comprise separate pipe or hose connections (not shown) which fluidly couple the chambers 161*a-c* in a series configuration. The conduits 162 are arranged at separated regions along the length of the respective bladder 161 and arranged to correspond with the principal hinged couplings (not shown) of the support frame 210 of the bed frame 200. The conduits 162 are arranged to minimise any kinking or collapsing of the first bladder 161 and second bladders (not shown) as the bladders conforms to the underlying surface of the profiled support frame 210, which may otherwise fluidly isolate portions of one or both of the bladders 161, thereby preventing inflation and/or deflation of the bladder(s) 161.

The first bladder 161 and second bladder (not shown) are inflatable via a pump (not shown) which is fluidly coupled to each chamber via a hose 163, and controlled via a controller 170. The controller 170 comprises a clock or timer (not shown) which enables an operator (not shown) to select a timing sequence for inflating and deflating the first bladder 161 and second bladder (not shown). For example, the controller 170 may include a control panel 171 having a user interface comprising a plurality of buttons 172 for selecting a 1 hour, 2 hour, 4 hour cycle etc., for inflating and deflating the first bladder 161 and second bladder (not shown). The control panel 171 may alternatively or additionally comprise input means (not shown) for selecting specific times for inflating and deflating the first bladder 161 and second bladder (not shown).

The central region 111 of the support platform 110 comprises a width such that a patient lying on the central region 111 extends over at least some of the support slats 130 disposed along the first and second side (namely right and left side) of the platform 110. In this respect, as the first/second bladder inflates for example, the first/second plurality of support slats 130 pivot about the central region 111 to turn a patient on their left/right side, respectively. In order to minimise any lateral movement of the support slats 130 relative to the central portion 123 of the support sheet 120 (which would typically be formed of a fabric material) as the support slats pivot relative to the base slats 152, the central longitudinal portion 123 may separately comprise a plurality of support members (not shown) disposed therealong, which extend across the width of the central portion 123. The support members comprise a similar cross-sectional shape and size to the adjacent slats and provide lateral support to the central portion 123 to minimise any buckling of the central portion 123. The support members may be arranged in separate pockets (not shown) disposed along the central portion 123, and the discrete arrangement of support members further enable the central portion 123 and thus the apparatus 100, to conform to longitudinal variations in the underlying bed support frame 210.

In use, the support platform 110 and base 130, together with the first 161 and second bladder may enclosed within a cover (not shown) which can be sealed to prevent any ingress of dirt or infectious material onto the platform 110, base 130 and bladders 161. The cover (not shown) can be releasably sealed via a closure (not shown) and thus removed from the support platform 110, base 130 and bladders 161 for cleaning. The support platform 110, base 130 and bladders 161, enclosed within a cover (not shown) may be initially arranged in a rolled, storage configuration and deployed by unrolling the arrangement upon the bed support frame 210 such that the central region of the platform 111 extends along a central longitudinal region of the bed support frame 210, with the support 130 and base slats 152 extending across the frame 210. Upon referring to FIGS. 3 and 4 of the drawings, it is evident that alternate pockets 121, 122, 151 of the support sheet 120 and base sheet 150 have been left unoccupied with a slat 130, 152. This provides for a more flexible support platform 110 and base 130 which can conform more closely with the particular profiling of the bed support frame 210. It is to be appreciated however, that all of the pockets 121, 122, 151 could instead be occupied or a selected few pockets 121, 122, 151 left unoccupied to suit the particular bed support frame 210.

Figure 3:
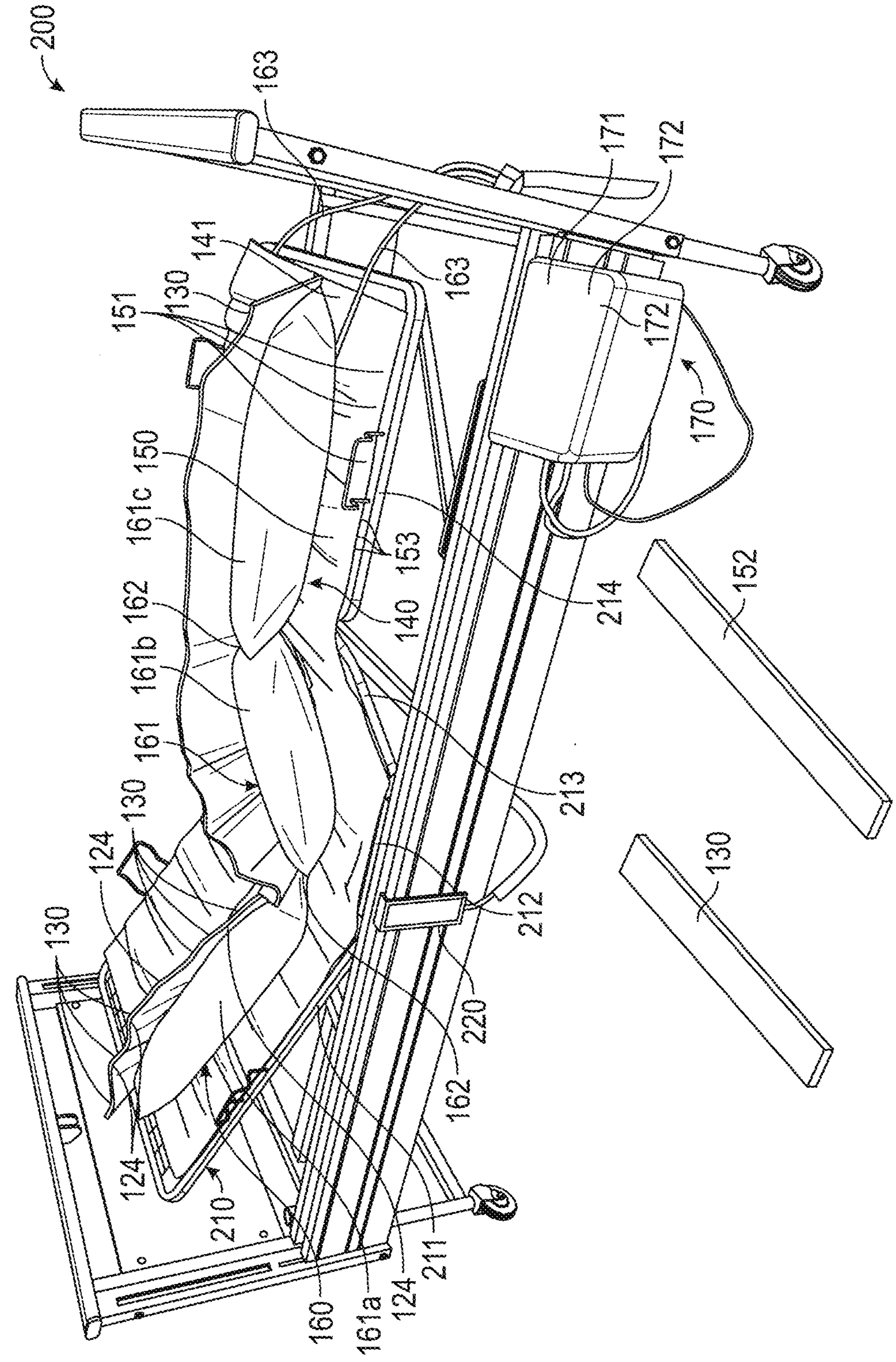
FIG. 3 is a perspective view of the patient turning apparatus illustrated in FIG. 1, disposed upon a bed frame configured in a profiled configuration, with the first plurality of support slats pivoted about the central portion.
Figure 4:
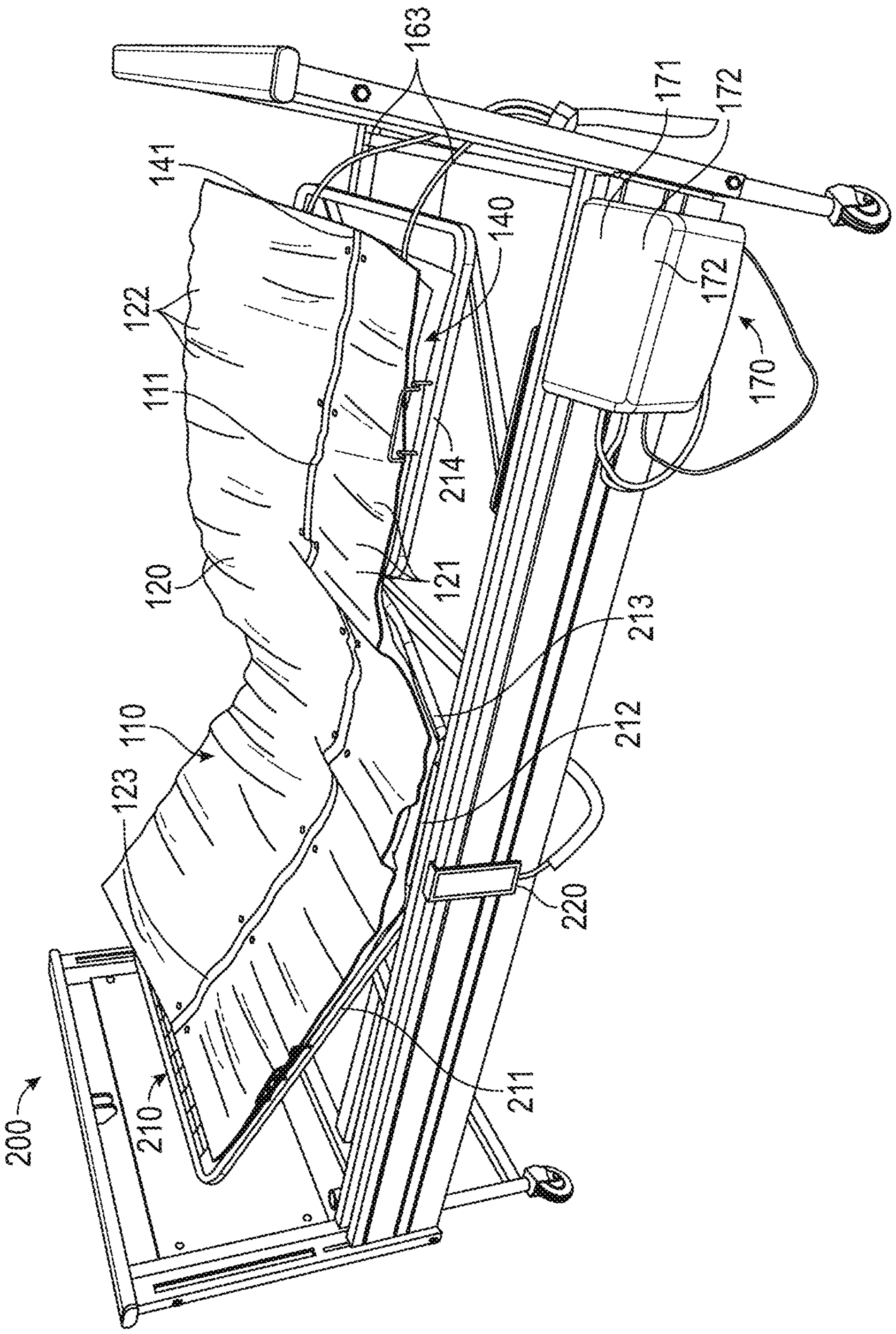
FIG. 4 is a perspective view of the patient turning apparatus illustrated in FIG. 1 disposed upon a bed frame configured in a profiled configuration, with the second plurality of support slats pivoted about the central portion.

With the platform 110, base 130 and first and second bladders 161 deployed upon the frame 210 (and a mattress (not shown) disposed upon the support platform 110), an operator (not shown) subsequently fluidly couples the first and second bladder 161 to the pump (not shown) and controller 170, via a respective hose 163. The operator then selects the desired sequence for inflating and deflating the first and second bladder (only the first bladder 161 is illustrated) for turning the patient. For example, the operator may select a 1 hour cycle via the control panel 171 on the controller 170. This cycle may initially cause the first bladder 161 to inflate; as the first bladder inflates, it presses against the base 130 which cannot move due to the bed support frame 210 and the inherent lateral rigidity of the base slats 152, thereby causing the first plurality of support slats 130 to pivot about the central region 111 of the support platform 110 to lift the right side of the mattress (not shown) and thus turn the patient (not shown) onto their left side (as illustrated in FIG. 3 of the drawings). The first bladder 161 may remain in this inflated state for 1 hour to maintain the patient in this position. After 1 hour, the controller 170 may act to deflate the first bladder 161 which causes the first plurality of slats 130 to pivot downwardly toward the base 140 and thus lower the right side of the mattress (not shown) so that the patient (not shown) becomes lowered onto their back. The controller 170 may subsequently cause the second bladder (not shown) to inflate to cause the second plurality of support slats 130 to pivot about the central region 111, thereby causing the left side of the mattress to lift and thus turn the patient onto their left side (as illustrated in FIG. 4 of the drawings). Similarly, the second bladder (not shown) may remain in this position for 1 hour prior to deflating and thus lowering the patient onto their back. The first and second bladder may then remain in a deflated state for a period of 1 hour, before the sequence recommences.

The first bladder 161 and second bladder (not shown) act upon the base 130 to cause the first and second plurality of support slats 130 to pivot about the central region 111. The base 130 provides a suitable surface upon which the bladders can act to lift the support slats 130 while also protecting the bladders 130 from any sharp edges or broken sections of the bed support frame 210 which may otherwise act to puncture the bladders 161.

The flexible nature of the support sheet 120 and base sheet 150 enable the support platform 110 and base 140 to conform to the desired bed profile, while the slats 130 152 provide a structural frame to the support sheet 120 and base sheet 150 to enable the turning of a patient with the bed configured in a profiled configuration, such as that illustrated in FIGS. 3 and 4.

In an alternative embodiment which is not illustrated, it is envisaged that longitudinally adjacent support slats 130 and separately, longitudinally adjacent base slats 152, may be directly coupled via one or more flexible straps (not shown), for example. This may obviate the requirement for a support sheet 120 and base sheet 150.

In yet a further embodiment which is also not illustrated, it is envisaged that the sub-chambers 161*a-c* of the first bladder 161 and second bladder (not shown) may fluidly isolated from each other. It is envisaged that each sub-chamber may comprise a dedicated fluid feed or duct from the pump (not shown), so that each sub-chamber of the first/second bladder, can be inflated and deflated separately to other sub-chambers of the first/second bladder, to provide turning of selected regions of the patient.

Figure 6:
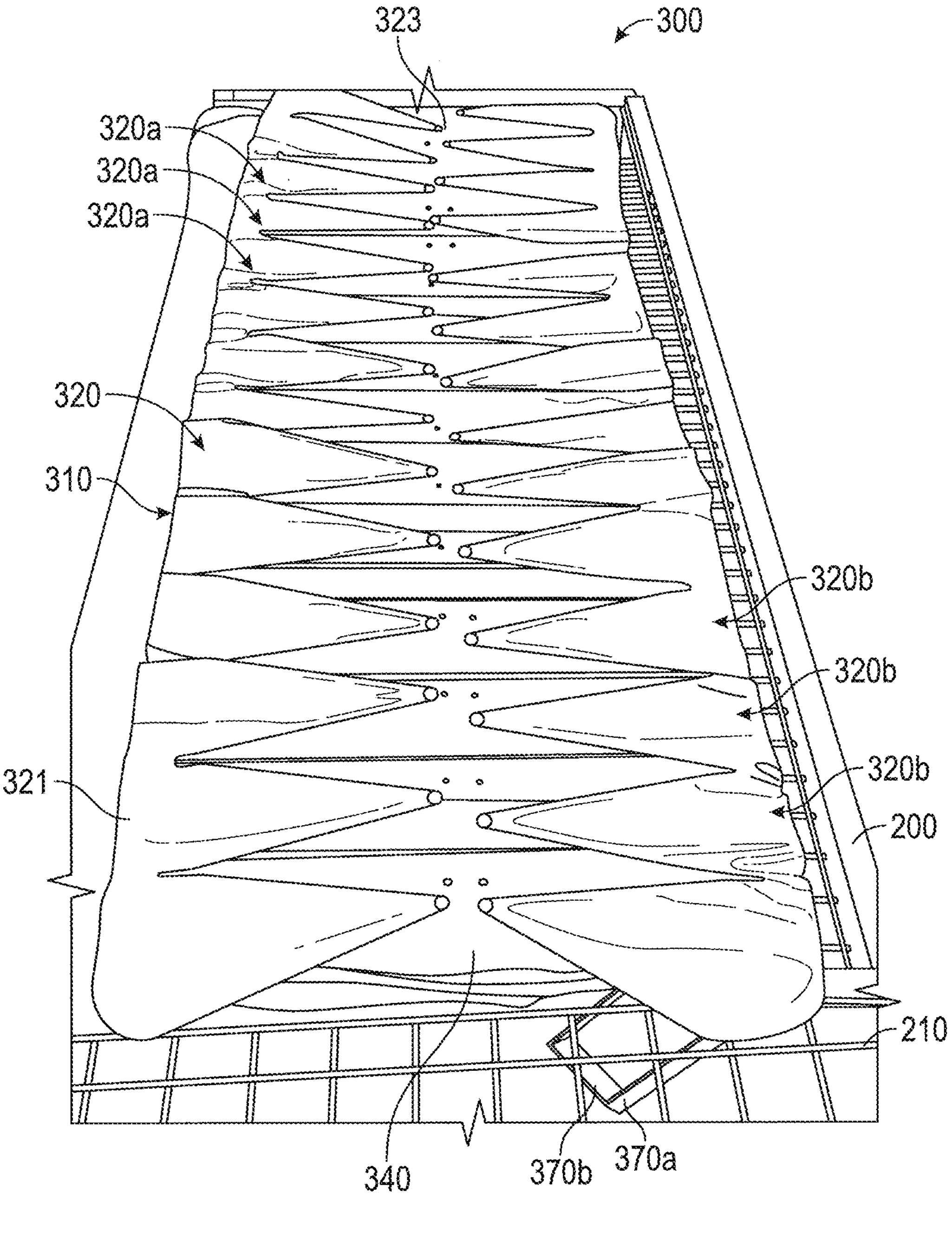

Referring to FIGS. 5-11 of the drawings, there is illustrated a patient turning apparatus 300 according to a second embodiment of the present invention. Referring to FIGS. 5 and 6 of the drawings, the patient turning apparatus 300 is illustrated as being disposed upon a bed frame 200 arranged in a flattened configuration or profile. The bed frame 200 comprises a support frame 210 upon which the apparatus 300 is disposed and in the illustrated embodiment, the support frame 210 comprises four frame sections 211-214 (see FIG. 10) which are hingedly coupled along a lateral direction and which are arranged to provide support to different regions of a patient (not shown), such as the patient's upper body, waist region and lower body.

The apparatus 300 comprises a reconfigurable support platform 310 and a reconfigurable support base 340, which in use is arranged upon the support frame 210 of the bed frame 200, and arranged to extend adjacent a mattress (not shown), for example. The support platform 310 comprises a plurality of interconnected support elements 320 which may be formed of a plastics material, such as polyurethane, or a fabric material, such as Nylon®, for example. The support elements 320 separately comprise an elongate pocket 321 and are orientated to extend laterally across the platform 310, in a substantially parallel configuration.

The support elements 320 are configured to a first plurality of elements 320*a* which extend to a first side of a central longitudinal portion 323 of the platform 310 and a second plurality of elements 320*b* which extend to a second side of the central longitudinal portion 323.

The pockets 321 comprise an opening 321*a* disposed at a distal end thereof, and the distal end of the pockets associated with the first and second support elements 320*a*, 320*b*, respectively define a first and second lateral edge of the platform 310. The pockets 321 are closed at a proximal end thereof, which is disposed adjacent the central longitudinal portion 323 of the support platform 310. The opening may be closable via a respective flap (not shown) which is secured at an underside of the respective support element 320, and arranged to pivot around the distal end of the pocket to an upperside of the support element 320 to close the opening. The flap may be detachably coupled to the element via fastening means (not shown), such as a hook-and-loop type fastening arrangement (not shown). Alternatively, the openings may be closed via a weld for example, once the slats have been inserted within the respective pockets 321. The pockets 321 are arranged to separately receive a support slat 330 having a substantially planar, elongate shape which tapers towards the central longitudinal portion 323. The support slats 330 are formed of a rigid, plastics material, such as high density polyethylene, and are arranged to provide a structural frame to the support platform 310. The support slats 330 are longitudinally separated along the platform 310; however, owing to the slats 330 being disposed within the pockets and an interconnection portion 324, such as a web portion, between longitudinally adjacent elements 320, it is evident that any pivotal movement of one slat 330 will cause longitudinally adjacent slats 330 in adjacent pockets 321 to follow the pivotal movement.

The support apparatus 300 of the second embodiment, further comprises fastening members 390*a*, 390*b* which are used to attach the support elements 320 and thereby the pockets 321 to the base 340. The fastening means may comprise a detachably coupleable arrangement such as hook and loop fastening arrangement, pop studs, button or any other reasonable releasable attachment mechanism. As shown, the fastening members are disposed at the proximal end of the elements 320 for coupling with fastening members disposed along a central region of the base 340, thereby forming a point of rotation for the pivoting of the support elements 320.

Figure 7:
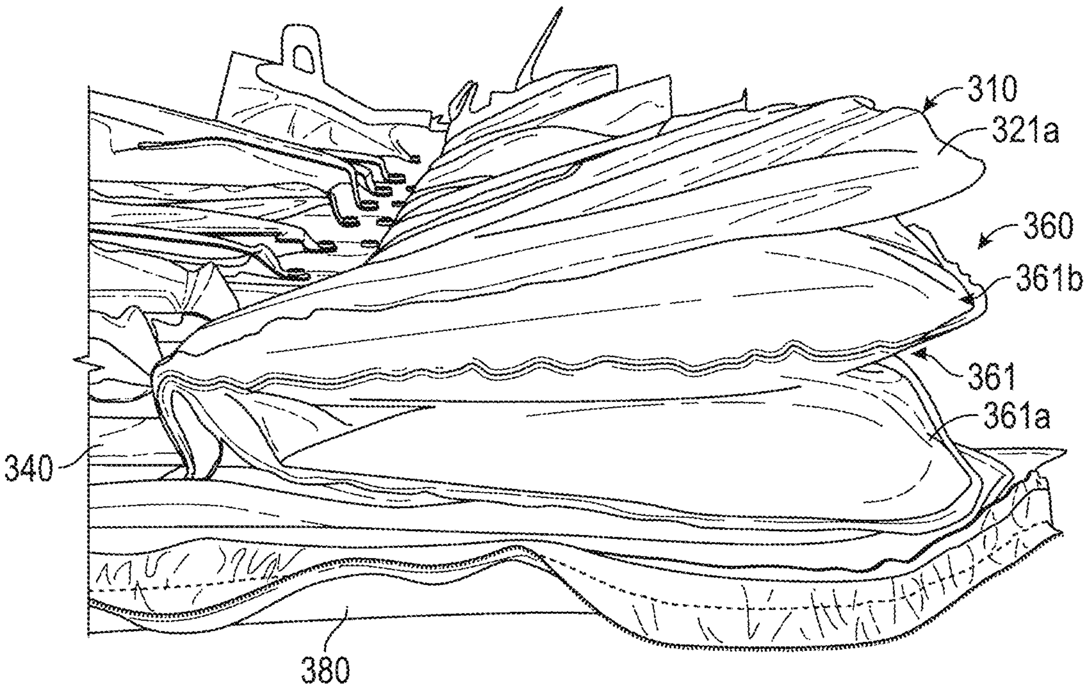
FIGS. 7 and 8 are end views of the patient turning apparatus illustrated in FIGS. 5 and 6, disposed upon a bed frame configured in a flattened configuration, with the first plurality of support slats pivoted about the central portion through a first pivotal range (FIG. 7), and beyond the first pivotal range (FIG. 8), respectively.
Figure 8:
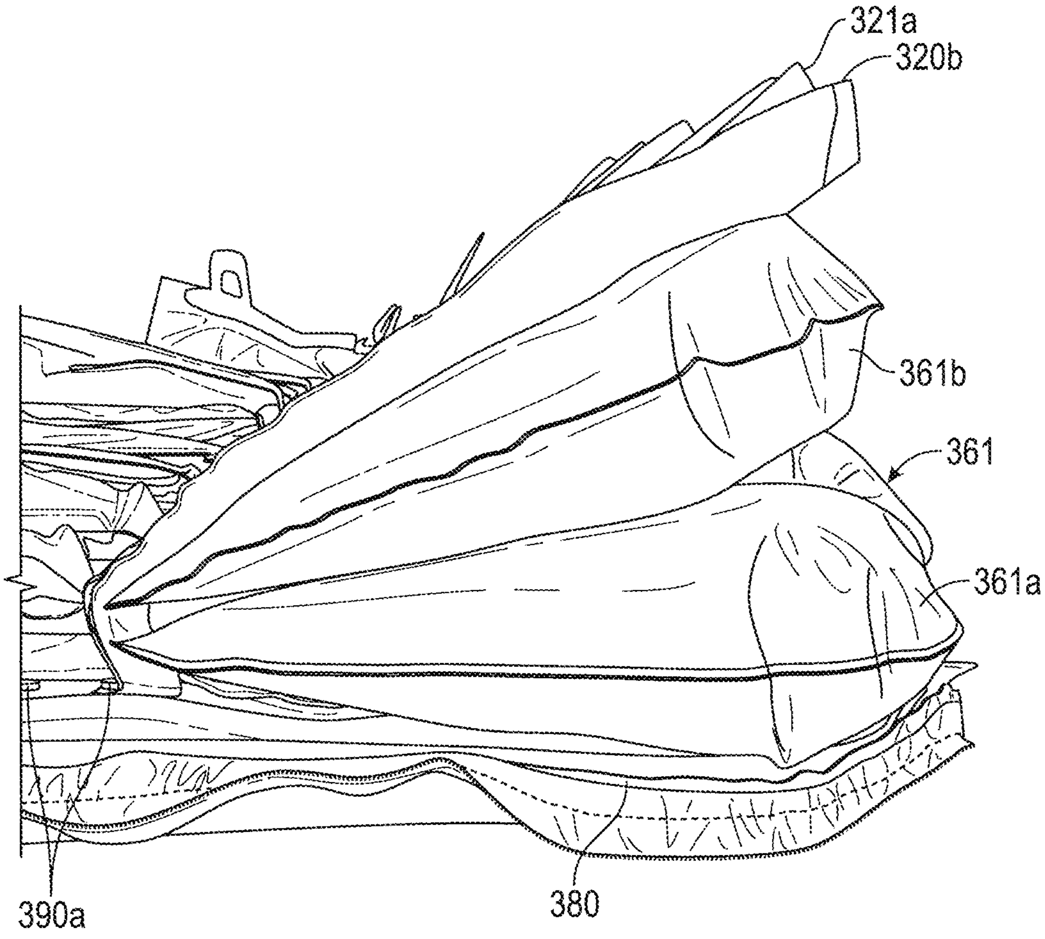

The apparatus of the second embodiment further comprises means 360 for controlling pivotal movement of the support elements 320. Referring to FIGS. 7 and 8 of the drawings, there is illustrated a close up view of a pivot controlling means 360 operable to control the pivotal movement of at least one support slat 330 of the platform 310 about the central portion 323. The pivot controlling means 360 comprises an inflatable bladder 361 comprising a first inflatable chamber 361*a* and a second inflatable chamber 361*b* disposed one above the other. The bladder 361 is disposed at the underside of the support platform 310, between the support platform 310 and the base 340. Each support element 320 comprises a respective inflatable bladder 361 and the bladders 361 are inflated and deflated using a pump 370*a* which is controlled via a control unit 370*b*. The pump 370*a* is fluidly coupled to the bladders 361 via a conduit or fluid path, and the bladder 361 associated with each support element 320 may be separately addressable, to permit a selective inflation and deflation thereof.

Each inflatable bladder 361 comprises at least two inflatable chambers 361*a*, 361*b*. This allows greater control over the inflation and in particular, the pivotal range through which the support elements 320 can be pivoted. The inflatable chambers 361*a*, 361*b* of each element 320 may be fluidly coupled or fluidly isolated from each other. In situations where the chambers are fluidly coupled, then the fluid connection between the chambers may be provided by a valve (not shown) which is arranged to open and thus admit fluid into a second chamber 361*b*, only once a pre-determined pressure has been applied to the first chamber 361*a*, for example. Alternatively, the chambers 361*a*, 361*b* of the bladder 361 of each element 320 may be inflated and deflated via a respective fluid conduit 375.

Figure 9:
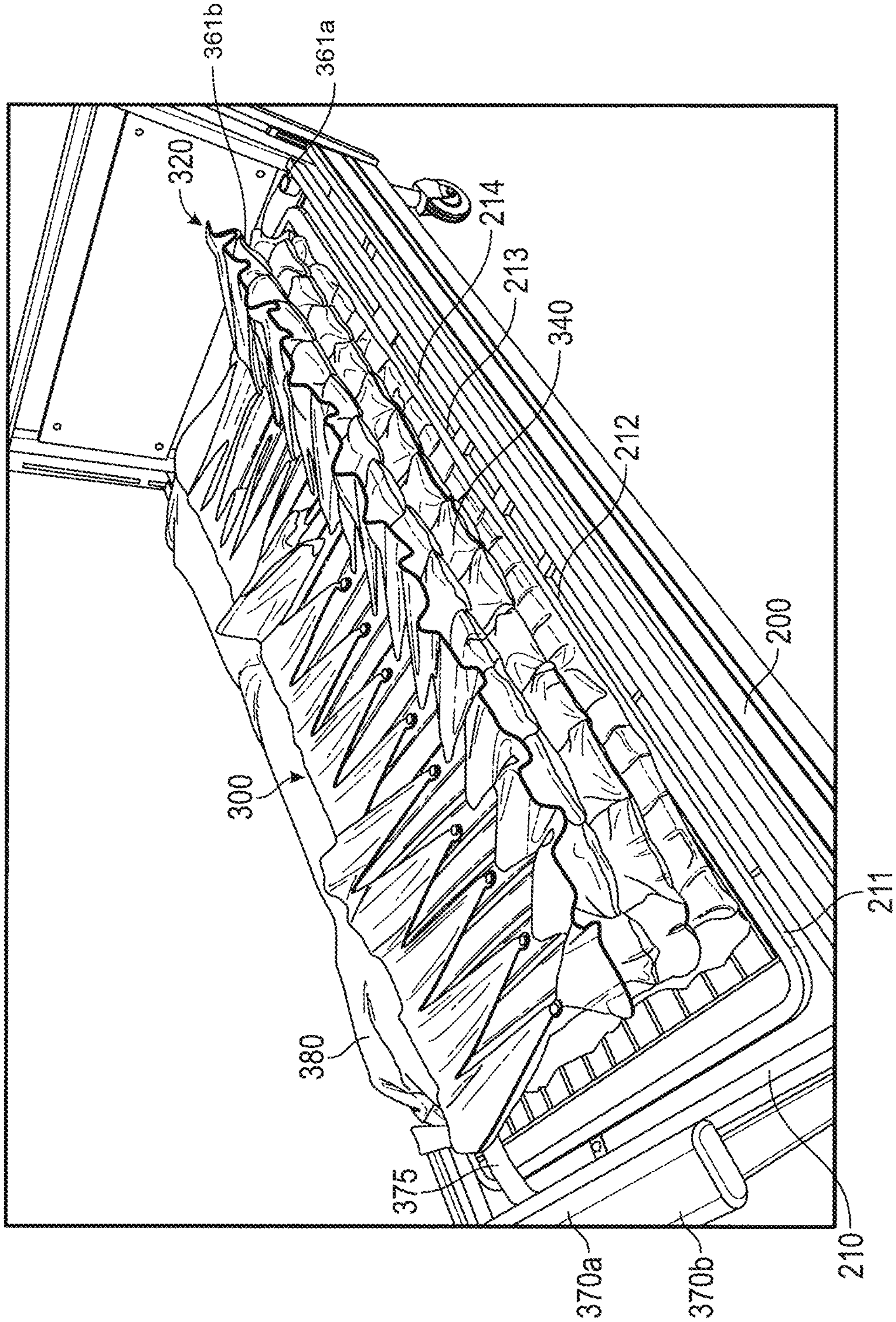
FIG. 9 is a perspective view of the patient turning apparatus illustrated in FIG. 5 disposed upon a bed frame configured in a flattened configuration, with the second plurality of support slats pivoted about the central portion.

Referring to FIGS. 9 and 10 of the drawings, there is illustrated a patient turning apparatus 300 according to the second embodiment, disposed upon a bed frame 200 configured in a flattened configuration and profiled configuration respectively, with the first plurality of support elements 320*a* pivoted about the central portion 323.

The apparatus 300, namely the support platform 310 and base 340, may be enclosed within a removable cover 380 (FIG. 11). The cover 380 is arranged to minimise the ingress of any dirt or infectious material. Referring to FIG. 11 of the drawings, there are shown different configurations of the patient turning apparatus 300 according to the second embodiment. The reconfigurable nature of the platform 310 and base 340 permits the apparatus to be configured in a rolled configuration for storage, as illustrated in FIG. 11*a*. This stowed configuration reduces the space occupied by the apparatus so that it can be easily stored when not required and/or transported.

During use, when the apparatus is required for use, the apparatus is first reconfigured from the stowed configuration by unrolling the apparatus (as shown in FIG. 11*b* with the cover 380 removed) upon a support frame of a bed frame and a mattress or equivalent is then placed upon the apparatus. When it is necessary to turn a patient (not shown) lying upon the apparatus 300, the user initiates a turning sequence via the control unit 370*b*. However, it is to be appreciated that this turning sequence may be initiated automatically at pre-set times for example.

Referring to FIG. 12, there is illustrated a method 400 of turning a patient upon a bed, according to an embodiment of the present invention. During a turning sequence, the control unit instructs the pump 370*a* to commence an inflation of the bladders 361, and principally the first chamber 361*a* of the bladders 361, associated with the first plurality of support elements 320*a*, to cause the first plurality of support elements 320*a* to pivot through a first pivot range at step 401 (as illustrated in FIG. 7), and thus partially turn the patient to one side.

The control unit 370*b* subsequently instructs the pump 370*a* to commence an inflation of the bladders 361, and principally the first chamber 361*a* of the bladders 361, associated with the second plurality of support elements 320*b*, to cause the second plurality of support elements 320*b* to pivot through a second pivot range at step 402, which is less than the first pivot range. This pivoting of the second plurality of support elements 320*b* is to support the patient to prevent the patient from completely rolling over during the turning process.

The control unit 370*b* subsequently instructs the pump 370*a* to further inflate the bladder 361 of the first plurality of support elements 320*a* and principally the second chamber 361*b* of the bladders 361 associated with the first plurality of support elements 320*a*, to cause the first plurality of support elements 320*a* to pivot beyond the first pivot range at step 403 (as illustrated in FIGS. 8, 11*c* and 11*d* (cover 380 removed) for example) to turn the patient.

Once the patient has turned onto their side, the control unit 370*b* instructs the pump 370*a* to deflate the bladders 361 associated with the second plurality of support elements 320*b*, and then subsequently instructs the pump 370*a* to deflate the bladders 361 associated with the first plurality of support elements 320*a*, so that the support platform 310 becomes deflated and thus flattened upon the underlying support frame 210 of the bed.

The method has the advantages that gentle tilting of a patient can occur and reduce the risk of flipping or tipping the patient out of a bed when repositioning them. The two steps of increase the tilt on one side is interspersed with the increase, to a lesser amount, the tilt applied on the other side; this forms a cradle or barrier to halt a patient's motion from the tilt on the one side. Furthermore, subsets of the first and/or second plurality of support elements 320*a*, 320*b* may be controlled separately to other elements 320. This allows for a tilt to be applied to different positions of the patient, and the degree of tilt or turning can be varied for example, by progressively increasing a tilt at a lower portion of the patients body at a rate greater than an upper portion of a patients body—this is less likely to disturb a sleeping patient and reduce patient momentum associated with the turning process. The timing and duration associated with the inflation (and deflation) of the bladders 361 of the support elements 320, can also be varied using the control unit 370*b*, to minimize discomfort to the patient. For example, and owing to a weight differential associated with different parts of a patients body, different support elements 320*a*, 320*b* may be pivoted at different rates to ensure that the patient is turned in a controlled manner.

It will be appreciated that the invention as described above provides benefits for the healthcare of patients.

The invention claimed is:

1. A patient turning apparatus (100) comprising:

a reconfigurable support platform (110) comprising:

a plurality of laterally extending support slats (130) configured for pivotal movement about a longitudinally extending central region (111) of the platform;

at least one support slat (130) being configured to follow a pivotal movement of a longitudinally adjacent support slat about the central region (111), through at least a portion of a pivotal range of movement of the longitudinally adjacent support slat;

the apparatus further comprising means (160) operable to control pivotal movement of at least one support slat of the platform about the central region wherein the means operable to control pivotal movement (160) of at least one support slat of the platform comprises an inflatable bladder (161) and wherein the support platform further comprises a support sheet (120) comprising a plurality of laterally extending pockets (121,122) formed therein for separately receiving a support slat.

2. Apparatus according to claim 1, wherein each support slat (130) is configured to follow a pivotal movement of a longitudinally adjacent support slat about the central region (111), through at least a portion of a pivotal range of movement of the longitudinally adjacent support slat (130).

3. Apparatus according to claim 1, wherein the support slats (130) are interconnected (124) to permit the support slats to pivot in response to a pivoting of a longitudinally adjacent support slat beyond a threshold pivotal range.

4. Apparatus according to claim 1, wherein the plurality of laterally extending support slats (130) comprise a first plurality of laterally extending support slats which extend to a first side of the central region and a second plurality of laterally extending support slats which extend to a second side of the central region.

5. Apparatus according to claim 4, wherein the first and second plurality of support slats extend in substantially the same plane when configured in an un-pivoted configuration.

6. Apparatus according to claim 1, wherein the pockets (121,122) extend from a longitudinally extending central portion (123) of the support sheet (120) and comprise a respective opening (121*a*, 122*a*) formed proximate a lateral edge of the support sheet.

7. Apparatus according to claim 6, wherein the support sheet (120) comprises a first plurality of laterally extending pockets (121*a*) which extend to a first side of the central portion of the support sheet and a second plurality of laterally extending pockets (112*a*) which extend to a second side of the central portion of support sheet.

8. Apparatus according to claim 1, further comprising a reconfigurable base (140) which is disposed in use at an underside of the platform (110).

9. Apparatus according to claim 8, wherein the base (140) comprises a plurality of laterally extending base slats (152) and wherein the base slats (152) extend across a width of the base (140), to either side of a central region of the base.

10. Apparatus according to claim 9, wherein the base further comprises a base sheet (150) which comprises a plurality of laterally extending pockets (153) formed therein for separately receiving a base slat (152) and wherein the pockets (153) extend along a width of the base sheet (150), to either side of a central portion of the base sheet, and comprise an opening formed at one end thereof, through which a slat (152) can be inserted into the pocket.

11. Apparatus according to claim 9, wherein the plurality of base slats (152) are configured for pivotal movement about a longitudinally extending central region (141) of base (140).

12. Apparatus according to claim 11, wherein, the plurality of base slats (152) comprise a first plurality of laterally extending base slats which extend to a first side of the central region and a second plurality of laterally extending base slats which extend to a second side of the central region.

13. Apparatus according to claim 1, wherein the inflatable bladder (161) is disposed between the platform (110) and the base (140) to permit the support slats (130) to pivot with respect to the base.

14. Apparatus according to claim 1, further comprising a pump which is fluidly coupled to the inflatable bladder (161) via a duct and a control unit (170) for controlling operation of the pump to control a selected inflation and deflation of the inflatable bladder (161).

15. A method (400) of turning a patient using a patient turning apparatus according to claim 1, the method comprising the steps:

pivoting a first plurality of laterally extending support slats through a first pivotal range (401);

subsequently pivoting a second plurality of laterally extending support slats through a second pivotal range (402), the second pivotal range being less than that of the first pivotal range; and subsequently pivoting the first plurality of laterally extending support slats beyond the first pivotal range, while the second plurality of support slats remain pivoted through the second pivotal range.

16. Apparatus according to claim 2, wherein the support slats (130) are interconnected (124) to permit the support slats to pivot in response to a pivoting of a longitudinally adjacent support slat beyond a threshold pivotal range.

* * * * *